United States Patent [19]
Park

[11] Patent Number: 5,721,809
[45] Date of Patent: Feb. 24, 1998

[54] MAXIMUM VALUE SELECTOR

[75] Inventor: Soung Hwi Park, Pusan-si, Rep. of Korea

[73] Assignee: LG Semicon Co., Ltd., Chungcheongbuk-do, Rep. of Korea

[21] Appl. No.: 644,417

[22] Filed: May 10, 1996

[30] Foreign Application Priority Data

May 12, 1995 [KR] Rep. of Korea ............... 11778/1995

[51] Int. Cl.$^6$ ........................................... G06G 7/00
[52] U.S. Cl. ................ 395/3; 364/715.06; 340/146.2
[58] Field of Search .................. 395/775, 3; 340/146.2; 364/715.06, 769, 724.3

[56] References Cited

U.S. PATENT DOCUMENTS

| | | | |
|---|---|---|---|
| 3,428,946 | 2/1969 | Batcher | 364/715.06 |
| 3,740,538 | 6/1973 | Hemphill | 364/715.06 |
| 4,012,714 | 3/1977 | Lohmann | 340/146.2 |
| 4,410,960 | 10/1983 | Kasuya | 364/715.06 |
| 4,567,572 | 1/1986 | Morris | 364/715.06 |
| 4,628,483 | 12/1986 | Nelson | 340/146.2 |
| 4,998,219 | 3/1991 | Frauenglass | 364/715.06 |
| 5,122,979 | 6/1992 | Culverhouse | 364/715.06 |
| 5,266,918 | 11/1993 | Won | 340/146.2 |
| 5,548,270 | 8/1996 | Kim | 340/146.2 |

FOREIGN PATENT DOCUMENTS

| | | | |
|---|---|---|---|
| 051291 | 5/1976 | U.S.S.R. | 364/715.06 |

OTHER PUBLICATIONS

Gourlay, "Circuit for finding the minimum of maximum of a set of binary numbers", IBM TDB vol. 25 No. 7a, Dec. 1982.

Shirley, "Parallel-search max/min word algorithm" IBM TDB vol. 22 No. 7, Dec. 1979.

Yuen, "A bit serial device for maximization and sorting," IEEE proceedings vol. 68 No. 2, p. 296, Feb. 1980.

Lee, "Ann area efficient maximum/minimum detection circuit for digital and video signal processing," 1993 IEEE Int'l Symposium on circuits and systems, Jun. 1993.

Daneshgaran, "Efficient parallel pripelinable VLSI architecture for finding the maximum binaray number," IEEE proceedings, circuits, devices, and systems vol. 141 issue 6 p. 527, Dec. 1994.

Chien, "Adaptive binary sorting schemes and associated intercdonnection networks," IEEE Transactions on parallel and distributed systems, vol. 5 issue 6, p. 561, Jun. 1994.

Lee, "A parallel bit level maximum/minimun selector for digital and video signal processing," IEEE Transactions on circuits and systems II: Analog and digital signal processing, vol. 41 No. 10 p. 693, Oct. 1994.

*Primary Examiner*—Robert W. Downs
*Assistant Examiner*—Jeffrey S. Smith

[57] ABSTRACT

A maximum value selector, for selecting the maximum value among m binary words of n-bits each, including: n unit-bit-parallel comparators connected serially, each comparator comparing bit values at a common position in all the words (the first comparator operating on the most significant, the second comparator operating on the n−1 bit position, ... and the n−1 comparator operating upon the zeroith bit position) and a set corresponding carry signals bit by bit and outputting the thus-obtained maximum value designating signals to be used as the carry signals of the next lower significant bit; and a multiplexer for outputting the maximum value among m binary words in accordance with the maximum value designating signal output from the unit-bit-parallel comparator associated with the least significant bit.

9 Claims, 3 Drawing Sheets

MAXIMUM VALUE SELECTOR

BACKGROUND OF THE INVENTION

The present invention relates to a maximum value selector, and more particularly, to a maximum value selector which achieves a reduced delay and a high-speed data processing by simultaneously comparing and processing a plurality of input signals.

In general, a maximum value selector for selecting an input signal having the maximum value among the plurality of input signals and outputting the selected signal is essential for fuzzy processors.

Hereinbelow, the conventional maximum value selector will be described with reference to FIGS. 1 and 2.

FIG. 1 is a schematic block diagram showing an arrangement of a prior art and FIG. 2 is a schematic block diagram of another prior art two-input maximum value selector.

The maximum value selector for selecting a maximum value among five n-bit data A, B, C, D and E, shown in FIG. 1, is constituted by a first 2-input maximum value selector 1 for comparatively selecting i.e., comparing and selecting, one of two n-bit binary words A and B and outputting the larger word of the two, a second 2-input maximum value selector 2 for comparatively selecting one of two n-bit binary words C and D and outputting the larger word of the two, a third 2-input maximum value selector 3 for receiving the selected binary words output from the second 2-input maximum value selector 2 and an n-bit binary word E as its inputs, comparatively selecting the received inputs and outputting the larger word of the two, and a fourth 2-input maximum value selector 4 for receiving the binary word output from the third 2-input maximum value selector 3 and the binary word output from the first 2-input maximum value selector 1, comparatively selecting the received inputs and outputting the larger word of the two. The configurations of the first to fourth 2-input maximum selectors of FIG. 1 are the same as that shown in FIG. 2.

As depicted in FIG. 2, the prior art two-input maximum value selector includes a binary magnitude comparator 5 for comparing two n-bit binary digits and outputting a signal "high" to a corresponding output port, and a 2-input n-bit multiplexer 6 for selecting the output signal of the binary magnitude comparator 5 and outputting one of the two n-bit binary digits.

The operation of the convention maximum selector having the aforementioned configuration will now be described by reference to FIG. 2. The two n-bit binary digits A and B are input to the binary magnitude comparator 5 and to the input ports $I_0$ and $I_1$ of 2-input n-bit multiplexer 6. The binary magnitude comparator 5 determines whether A is greater than B or vice versa and outputs a signal "high" to the corresponding output port.

For example, if A is greater than B, a signal "high" is generated to an output port $P_{out1}$. If B is greater than A, a signal "high" is generated to an output port $P_{out2}$. If A equals to B, either signal may be generated to its corresponding output port.

In the respective control ports $S_0$ and $S_1$ for outputting one of the two binary word each being input to input ports $I_0$ and $I_1$ of the 2-input n-bit multiplexer 6, if control port $S_0$ is "high," then the binary word input to the input port $I_0$ of the 2-input n-bit multiplexer 6 is outputted by the multiplexer 6. If control port $S_1$ is "high," then the binary word input to input port $I_1$ of 2-input n-bit multiplexer 6 is outputted by the multiplexer 6.

Again, the control ports $S_0$ and $S_1$ are connected to output ports $P_{out1}$ and $P_{out2}$ of the binary magnitude comparator 5, respectively. If A is greater than B, then the control port $S_0$ is made high, thereby causing the multiplexer 6 to output the binary word A. In the same manner, if B is greater than A, then the control port $S_1$ is made high, thereby causing the multiplexer 6 to output the binary word B.

By the same manner as those described above, the respective 2-input n-bit maximum value selectors 2, 3 and 4 compare binary digits C, D and E and generate each maximum value.

However, the conventional maximum value selector involves the following problems.

First, serial comparison operations for comparing only inputs and outputting the comparison result are repeated several times, lowering the operational speed.

Second, because multiple comparators and multiplexers are necessary, the circuit becomes complex and the chip space becomes larger in the case of the semiconductor integrated circuit thereof.

Third, because a comparator of fixed number of bits is used, a change in bit numbers is not easy, which decreases the applicability.

SUMMARY OF THE INVENTION

To solve the above problems, it is an object of the present invention to provide a maximum value selector which can improve the operational speed by using one-bit unit-parallel-comparators, simplify the circuitry to then reduce the chip space and facilitate the change of bit numbers of input binary words.

To accomplish the above object, the maximum value selector according to the present invention for selecting the maximum value among m input n-bit binary words, comprises: n unit bit parallel comparators connected serially for respectively comparing m binary unit bits with the corresponding carry signals bit by bit and outputting the thus-obtained maximum value designating signals as each carry signal of the next lower significant bit, and a multiplexer for finally outputting the maximum value among m binary words input in accordance with the maximum value designating signal output from the unit bit parallel comparator of the least significant bit.

The objects of the present invention are also achieved by providing a method for selecting at least one word representing a greatest numerical value in a maximum value selector from among a plurality of words of n-bits each, comprising the steps of: sequentially performing a parallel comparison of bit values at the same bit position in all the words, beginning at the most significant bit position and ending at the least significant bit position; retaining, at each step of the parallel comparison, those words of greatest value as defined by the then-compared bit positions; and eliminating, at each step of the parallel comparison, those words of less than the greatest value as defined by the then-compared bit positions. In the case where each of the plurality of n-bit words is a different value, the method will identify, i.e., retain, only one word representing the greatest value.

The objects of the present invention are also achieved by providing a maximum value selector apparatus for selecting a word representing a greatest numerical value from among a plurality of words of n-bits each, comprising: n comparison means, each for performing a parallel comparison of bit values at the same bit position in all the words, a first

3 comparison means operating upon the bit values at the most significant bit position, a second comparison means operating upon the bit values at the n-1 bit position, and an n-1 comparison means operating upon the bit values at the zeroith bit position; each comparison means retaining those words of greatest value as defined by the then-compared bit positions and eliminating those words of less than the greatest value as defined by the then-compared bit positions.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
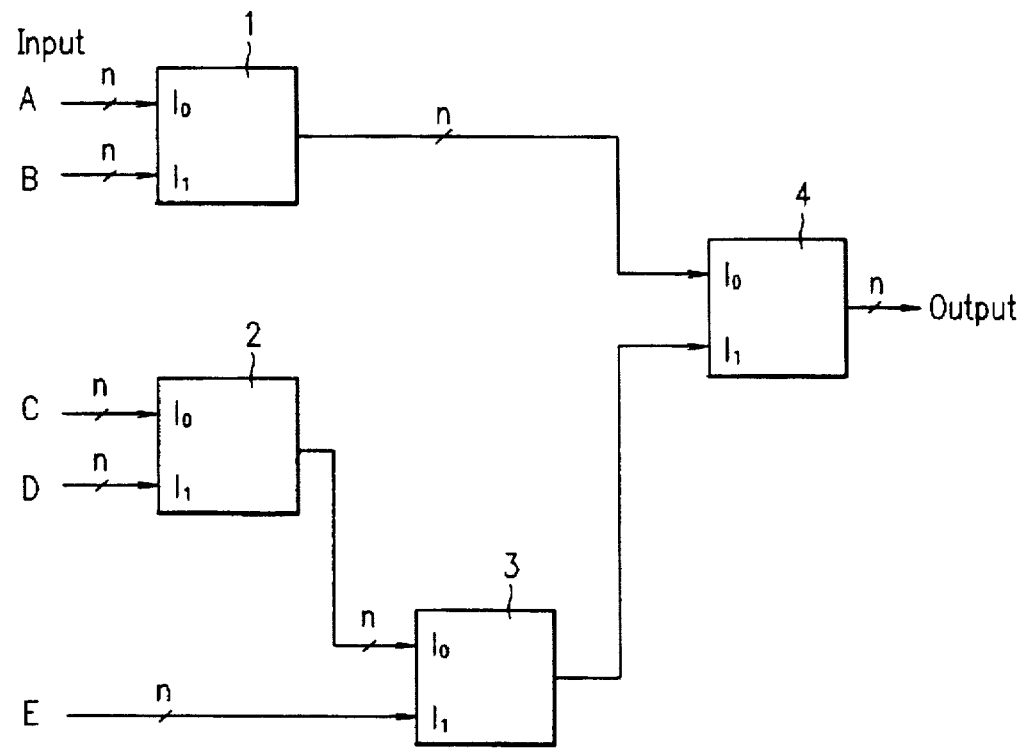
FIG. 1 is a schematic block diagram of an arrangement of prior art maximum value selectors.
Figure 2:
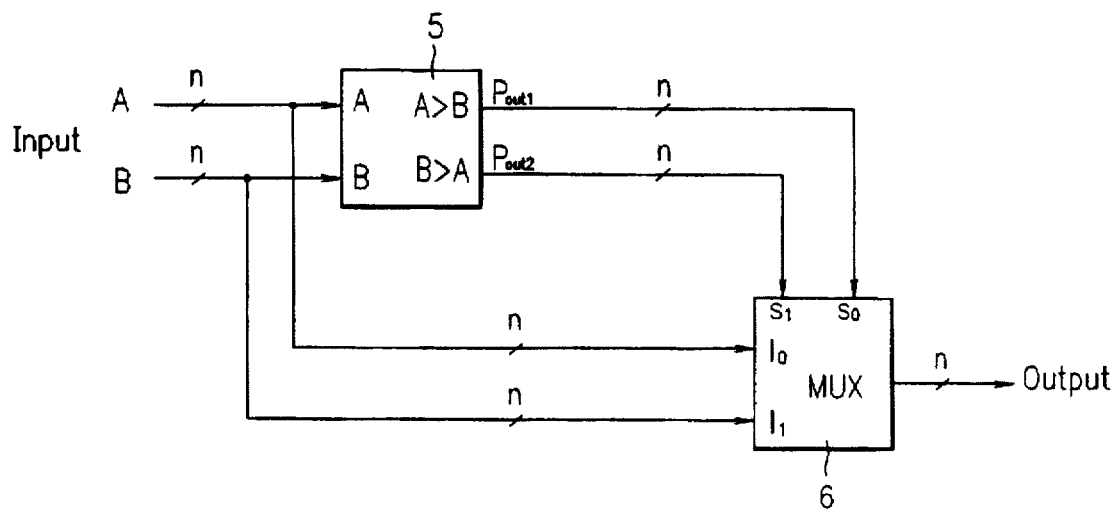
FIG. 2 is a schematic block diagram of a prior art two-input maximum value selector.
Figure 3:
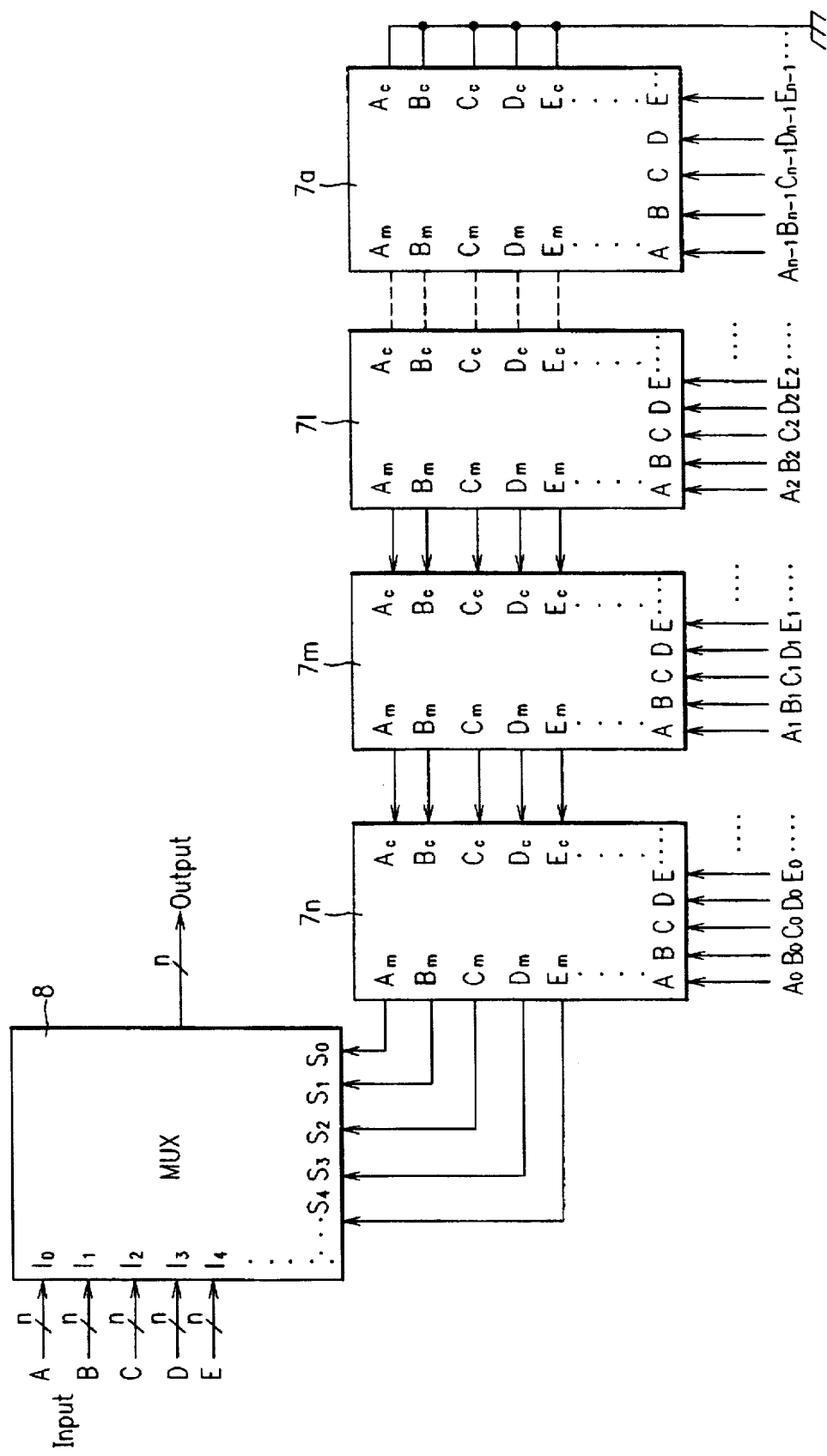
FIG. 3 is a schematic block diagram of a maximum value selector according to the present invention.

Referring to FIG. 3, the maximum value selector according to the present invention includes n unit-bit-parallel comparators $7a$, $7b$, ... $7m$, $7n$ connected serially so that a plurality of n-bit binary words are compared with carry signals, respectively, bit by bit, and then the output of the parallel comparator of unit bits for the upper significant bit is sequentially input as each carry of the parallel comparator of unit bits for the next lower significant bit, and a multiplexer for finally outputting the maximum value among a plurality of n-bit binary words input in accordance with the maximum value designating signal output from the parallel comparator $7n$ of the least significant unit bit.

Here, the unit bit parallel comparators have a number of input and output ports, respectively, commensurate with the number of binary words from which one word is to be selected. The configuration of the unit bit parallel comparators for the maximum value selector according to the present invention is shown in FIG. 4.

Figure 4:
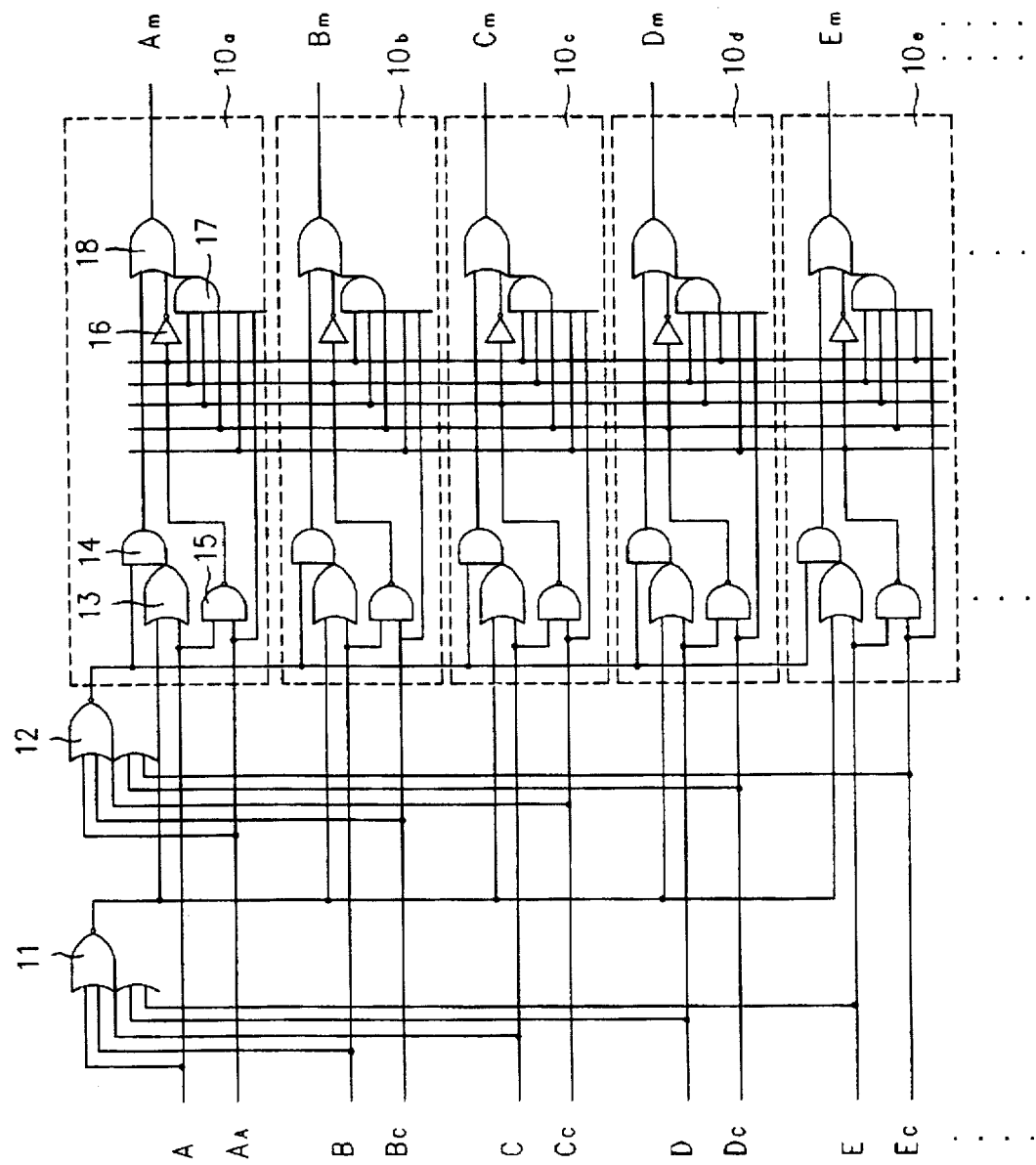
FIG. 4 is a circuit diagram of a unit bit parallel comparator according to the present invention.

As shown in FIG. 4, each of the unit bit parallel comparators $7i$ according to the present invention operates upon a single bit from each of the words A ... E and also upon the carry word from the immediately preceding unit bit parallel comparator $7_{i-1}$.

Each unit bit parallel comparator $7i$ of FIG. 4 includes: a plurality of input ports (not shown) for receiving input values of the respective unit bits of a plurality of input n-bit binary words and the corresponding carry values; a first NOR gate 11 for performing NOR operations with respect to the input values of the respective unit bits of the plurality of n-bit binary words and outputting the results; a second NOR gate 12 for performing NOR operations with respect to the

4 input carry values; and a plurality of logic operation units $10a$, $10b$, $10c$, $10d$, $10e$, ... for performing logic operations. Each logic operation unit $10_i$ operates primarily upon the output signals of the first and second NOR gates 11 and 12 and a bit from one of the plurality of n-bit binary words, and the corresponding carry signal, and operates secondarily upon the same bit position values from the other n-bit binary words and the corresponding carry signals, and also outputs a carry signal to the corresponding next lower significant bit unit-bit-parallel comparator.

In FIG. 4, the plurality of logic operation units $10a$, $10b$, $10c$, $10d$, $10e$, ... each includes: a first OR gate 13 for performing an OR operation with respect to the output signal of first NOR gate 11 and a bit value of the n-bit binary digit word and outputting the result; a first AND gate 14 for performing an AND operation with respect to the output signal of first OR gate 13 and the output signal of second NOR gate 12 and for outputting the result; a first NAND gate 15 for performing an NAND operation with respect to a bit value of the n-bit binary word and the corresponding carry value and for outputting the result; an inverter 16 for inverting the output of first NAND gate 15; a second AND gate 17 for performing an AND operation with respect to the output signal of each first NAND gate of the other logic operation units except the output signal of first NAND gate 15 of the corresponding logic operation units, and each input carry signal of the corresponding logic operation unit; and a second OR gate 18 for performing an OR operation with respect to the output signals of first AND gate 14, inverter 16 and second AND gate 17.

The operation of the parallel comparator of a unit bit according to the present invention having the aforementioned configuration will now be described.

Referring to FIG. 3 which shows a maximum selector for receiving five n-bit binary words and selecting the maximum value among these, a first unit bit parallel comparator $7a$ for comparing the most significant bit from each of the words A ... E receives all zeros, (0, 0, 0, 0 ... ) as carry values through its carry ports.

As shown in FIG. 4, because the respective logic operation units 10A, $10b$, $10c$, $10d$ and $10e$ perform operations with respect to the outputs of first and second NOR gates 11 and 12 in the same method with one another, only the operation of first logic operation unit $10a$ will be described hereinbelow. The maximum value designating signal $A_m$ is generated by the operation of the first and second NOR gates 11 and 12 and logic operation unit $10a$ according to the following equation:

$$A_m = A_c \cdot A + A_c \cdot \overline{B_c \cdot B \cdot C_c \cdot C \cdot D_c \cdot D \cdot E_c \cdot E} + (A + \overline{A + B + C + D + D}) \cdot (A_c + B_c + C_c + D_c + E_c).$$

Taking A as the exemplary word that will be considered, if both the bit from the n-bit binary word A and the corresponding carry signal $A_c$ are "1," then the maximum value designating signal $A_m$ becomes "1," irrespective of the bits from the words B, C, D and E and their corresponding carry signals $B_c$, $C_c$, $D_c$ and $E_c$. In other words, when both the bit A and the carry signal $A_c$ are "1," even if any other input is "1," the input of A is equal to or greater than other inputs.

When the bit from the word A is "1," and $A_c$ is "0," and if any other carry signal for this unit bit parallel comparator is "1," then the bit from the word A cannot be the maximum. Thus, $A_m$ becomes "0." If none of the other carry inputs for the unit bit parallel adder are "1," then the bit A is equal to or greater than the bits from the other words. Thus, $A_m$ becomes "1."

When the bit from the word A is "0," and $A_c$ is "1," and only if both a bit value for another word and the carry signal corresponding thereto are "1," then $A_m$ becomes "0," which is equal to or greater than other inputs. If no other bit and its corresponding carry signal are both "1," then $A_m$ becomes "1."

By the foregoing logic operations, the respective logic operation units 10b, 10c, 10d, 10e, ... perform the same logic operations with respect to the bit from the word B and the corresponding carry signal $B_c$, C and $C_c$, D and $D_c$, E and $E_c$, ... as those performed by the logic operation unit 10a with respect to the bit from the word A and the corresponding carry signal $A_c$ to generate each maximum value designating signal $B_m$, $C_m$, $D_m$, $E_m$ ...

The maximum value designating signals $A_m$, $B_m$, $C_m$, $D_m$, $E_m$, ... are then inputted to the second unit bit parallel comparator 7b (which operates on the next bit of the words A ... E) as its carry signals. Then, the same logic operations as those by the first unit bit parallel comparator 7a are performed.

By the aforementioned iterative operations, the multiplexer 8 selectively outputs the maximum value among an input plurality of n-bit binary words according to the maximum value designating signals $A_m$, $B_m$, $C_m$, $D_m$, $E_m$ ... output from n-th unit bit parallel comparator 7n, which operates on the least significant bit of the words A ... E.

As described above, the maximum value selector according to the present invention has the following advantages. Because the maximum value is selected by a parallel comparison of all the same bit positions at the same time, the operational speed is great and the circuit is simplified, thereby minimizing the chip space.

Also, because the number of the unit bit parallel comparators is determined according to the number of bits of words that are to be compared, the circuit is easily changed. Thus, e.g., motor control, or temperature control or fuzzy control can be attained efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A maximum value selector for selecting a maximum value among m binary words of n-bits each, comprising:

n unit-bit-parallel comparators, operatively connected serially, each comparator being operable to compare bit values at the same position in all the words and a set of corresponding carry signals and outputting maximum-value-designating signals operatively connected so as to be the carry signals of the next lower significant bit unit-bit-parallel-comparator;

wherein each said comparison by a comparator is a function of said bit values at said same bit position, said corresponding set of carry signals, and a logical-NOR operation upon said corresponding set of carry signals; and a multiplexer for outputting a maximum value among the m binary words in accordance with the maximum value designating signals outputted from a unit-bit-parallel comparator corresponding to the least significant bit;

wherein said each unit-bit-parallel comparator includes a first NOR gate for performing NOR operations with respect to the bit value of the same bit position of the m n-bit binary words and outputting the results, a second NOR gate for performing NOR operations with respect to said input carry values, and m logic operation units, each logic operation unit being operable to perform logic operations with respect to the output signals of said first and second NOR gates and a bit value from one of the binary words and the carry signal corresponding thereto, and being operable to perform logic operations with respect to bit values from the other m-1 words and the carry signals corresponding thereto respectively, and outputting a carry signal.

2. The maximum value selector as claimed in claim 1, wherein said first and second NOR gates and said respective logic operation units are structured such that:

if both a bit value and the corresponding carry signal are "1," then the maximum value designating signal is output as "1," irrespective of units bits input to other input ports and their carry signals, if said bit is "1," and the corresponding carry signal is "0," and if any of input carry signals input to another input ports is "1," then the maximum value designating signal is output as "0," but if all of carry signals are "0," then the maximum value designating signal is output as "1,"

if said bit is "0," and the corresponding carry signal is "1," and if both a bit value of another word and the carry signal corresponding thereto are "1," then the maximum value designating signal is output as "0," but if no other bit value and the carry signal corresponding thereto are "1," then the maximum value designating signal is output as "1".

3. The maximum value selector as claimed in claim 2 wherein, for five n-bit binary words A, B, C, D and E and the corresponding carry values are $A_c$, $B_c$, $C_c$, $D_c$ and $E_c$, said first and second NOR gates and said respective logic operations are structured to have logic operations so to have logic values as the following:

$$A_m = A_c \cdot A + A_c \cdot \overline{B_c \cdot B \cdot C_c \cdot C \cdot D_c \cdot D \cdot E_c \cdot E} + (A + \overline{A + B + C + D + D}) \cdot (A_c + B_c + C_c + D_c + E_c).$$

4. The maximum value selector as claimed in claim 1, wherein said respective logic operation units include a first OR gate for performing an OR operation with respect to the output signal of said NOR gate and a bit value of an n-bit binary word and outputting the result, a first AND gate for performing an AND operation with respect to the output signal of said first OR gate and the output signal of said second NOR gate and outputting the result, a first NAND gate for performing a NAND operation with respect to the bit value of the n-bit binary word and the corresponding carry value and outputting the result, an inverter for inverting the output of said first NAND gate, a second AND gate for performing art AND operation with respect to the output signal of each first NAND gate of the other logic operation units except the output signal of said first NAND gate of said corresponding logic operation units, and each input carry signal of said corresponding logic operation unit, and a second OR gate for performing an OR operation with respect to the output signals of said first AND gate, inverter and second AND gate.

5. A maximum value selector apparatus for selecting a word representing a greatest numerical value from among a plurality of words of n-bits each, $n \geq 2$, comprising:

n comparators, each for performing a parallel comparison of bit values at the same bit position in all the words, each said comparison being performed as a function of said bit values at said same bit position, a corresponding set of carry signals, and a logical-NOR operation upon said corresponding set of carry signals, including
   a first comparator operable to compare the bit values at the most significant bit position,
   a second comparator operable to compare the bit values at the n−1 bit position, and
   an $n^{th}$ comparator operable to compare the bit values at the zeroith bit position;
each comparator being operable to retain those words of greatest value as defined by the then-compared bit positions and eliminating those words of less than the greatest value as defined by the then-compared bit positions;
wherein each said comparator includes:
   a first NOR gate operable to receive all said bit values at said same position;
   a second NOR gate operable to receive said corresponding set of carry signals;
   a first OR gate operable to receive an output of said first NOR gate and a bit value of said same bit position;
   a first AND gate operable to receive an output of said first OR gate and an output of said second NOR gate;
   a first NAND gate operable to receive said bit value of said same bit position and a carry signal value carried into said same bit position of a corresponding one of the plurality of n-bit words;
   an inverter for inverting an output of said first NAND gate;
   a second AND gate operable to receive said carry signal carried into said same bit position, an output of said first NAND gate, and outputs of corresponding first NAND gates in all of the other comparators; and
   a second OR gate operable to receive an output of said inverter, an output of said first AND gate, and an output of said second AND gate, and being operable to output a signal representing a carry value at said same bit position of a corresponding one of said m binary words.

6. The apparatus as in claim 5, wherein:
each of the plurality of n-bit words represents a different value; and
the $n^{th}$ comparator being operable to retain a single word representing the greatest numerical value.

7. The apparatus as in claim 5, wherein:
each comparator is operable to compare a bit from each of five words A, B, C, D, and E according to the following logical equation:

$$A_m = A_c \cdot A + A_c \cdot \overline{B_c \cdot B \cdot C_c \cdot C \cdot D_c \cdot D \cdot E_c \cdot E} + (A + \overline{A+B+C+D+D}) \cdot (A_c + B_c + C_c + D_c + E_c).$$

8. The apparatus as in claim 5, further comprising:
a multiplexer for selecting the at least one word retained by the (n−1)th comparator.

9. The maximum value selector as in claim 1, wherein each logic operation unit includes:
   a first OR gate operable to receive an output of said first NOR gate and a bit value of said bit position;
   a first AND gate operable to receive an output of said first OR gate and an output of said second NOR gate;
   a first NAND gate operable to receive a bit value of said same bit position and a carry value carried into said same bit position of a corresponding one of said m binary words;
   an inverter for inverting an output of said first NAND gate;
   a second AND gate operable to receive said carry value carried into said same bit position, an output of said first NAND gate, and outputs of corresponding first NAND gates in all of the other logic operation units; and
   a second OR gate operable to receive an output of said inverter, an output of said first AND gate, and an output of said second AND gate, and being operable to output a signal representing a carry value at said same bit position of a corresponding one of said m binary words.

* * * * *